United States Patent
Burns et al.

(10) Patent No.: US 7,702,633 B2
(45) Date of Patent: Apr. 20, 2010

(54) PREVIEWS PROVIDING VIEWABLE REGIONS FOR PROTECTED ELECTRONIC DOCUMENTS

(75) Inventors: Eric Lee Burns, Seattle, WA (US); Dzmitry Suponau, Bellevue, WA (US); Harry Kaplanian, Mercer Island, WA (US); Jay Robert Girotto, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 11/682,041

(22) Filed: Mar. 5, 2007

(65) Prior Publication Data

US 2008/0235221 A1 Sep. 25, 2008

(51) Int. Cl.
*G06F 17/30* (2006.01)
(52) U.S. Cl. ............... 707/9; 707/3; 707/10; 707/201; 707/203
(58) Field of Classification Search ............ 707/3, 707/10, 200, 104.1, 9, 201, 203; 713/168; 700/234; 705/53, 50; 715/500.1
See application file for complete search history.

(56) References Cited

U.S. PATENT DOCUMENTS

| | | | |
|---|---|---|---|
| 5,734,719 A * | 3/1998 | Tsevdos et al. ............ 700/234 |
| 6,301,586 B1 | 10/2001 | Yang |
| 7,149,353 B2 | 12/2006 | Siegel et al. |
| 7,415,439 B2 * | 8/2008 | Kontio et al. ............... 705/53 |
| 2002/0091925 A1* | 7/2002 | Suzuki et al. ............... 713/168 |
| 2002/0129114 A1 | 9/2002 | Sundaresan |
| 2003/0078856 A1 | 4/2003 | Zubi |
| 2003/0107584 A1 | 6/2003 | Clapper |
| 2003/0117341 A1 | 6/2003 | Browning |
| 2003/0231769 A1 | 12/2003 | Bolle |
| 2004/0117728 A1 | 6/2004 | Gromer |
| 2004/0128324 A1* | 7/2004 | Sheynman et al. .......... 707/200 |
| 2005/0195221 A1 | 9/2005 | Berger |
| 2005/0210399 A1 | 9/2005 | Filner |
| 2006/0004685 A1 | 1/2006 | Pyhalammi |
| 2006/0010365 A1* | 1/2006 | Bodin et al. ............. 715/500.1 |
| 2006/0074985 A1* | 4/2006 | Wolfish et al. ........... 707/104.1 |
| 2006/0164693 A1 | 7/2006 | Matsumoto |

(Continued)

FOREIGN PATENT DOCUMENTS

KR 10-20030038573 5/2003

(Continued)

OTHER PUBLICATIONS

Hao-Hua Chu et al., "A Secure Multicast Protocol with Copyright Protection", ACM, Apr. 2002, pp. 42-60.*

(Continued)

*Primary Examiner*—Thuy N Pardo
(74) *Attorney, Agent, or Firm*—Shook, Hardy & Bacon, LLP

(57) ABSTRACT

A computer system and media for generating previews for protected electronic documents are provided. The computer system provides servers that receive rules corresponding to the protected electronic documents from owners of the protected electronic documents. The rules specify quantity and quality of each interaction, by client devices, with each protected electronic document. Additionally, the servers receive queries having query terms from the client devices. In response, the servers generate previews for the protected electronic documents that match the query. The previews are generated and transmitted to the client devices based on the rules stored by the servers.

20 Claims, 4 Drawing Sheets

U.S. PATENT DOCUMENTS

2007/0112676 A1* 5/2007 Kontio et al. .................. 705/50
2008/0123844 A1* 5/2008 Sun ........................... 380/200

FOREIGN PATENT DOCUMENTS

KR  10-20010107224  12/2008

OTHER PUBLICATIONS

Nasir Memon et al., "Protecting Digital Media Content", ACM, Jul. 1998, pp. 34-43.*

Shigeki et al., "Knowledge nebula crystallizer for time-based information", ACM, 2005, pp. 218-221.*

StarOffice ™ 8 Office Suite: Guide to New Features, (Available on-line at: http://web.mit.edu/soffice_v8.0/pdfdoc/S08_WhatsNew.pdf), Sep. 2005.

Laszlo Kovacs, "Visualizing Queries in a Distributed Digital Library System," EUROMICRO, p. 2110, Proceedings of the 26th EUROMICRO Conference (EUROMICRO'00)-vol. 2, 2000.

Ann Carlson Weeks, "The International Children's Digital Library: An Introduction to the Project and an Overview of Initial Research Findings," World Library and Information Congress: 69th IFLA General Conference and Council, Berlin, Germany, Aug. 1-9, 2003.

International Search Report, July 28, 2008.

* cited by examiner

| mind-blowing 🔍 | Select Additional Preview | 9 Previews Remaining | Buy |

210 — mind-blowing
230 — Select Additional Preview
240 — 9 Previews Remaining
250 — Buy 220:
10 ...and the beaches are simply mind-blowing with shells and trees and...

21 ...east shores, they are mind-blowing. In West O'ahu and on the North...

31 ...food that is more than mind-blowing. In fact the restaurant has been...

44 ...surfers perform the most mind-blowing moves. This area has...

90 ...sometimes the music can be mind-blowing . Performers such as Cher...

99 ...The mind-blowing interiors have seen the Royal Family and the other ...

101... stay away from the mind-blowing ice cream and dessert...

270 — Many of the Island's southern and eastern coasts are protected by inner reefs. The reefs provide still coastline water but not much as far as sand is concerned. However, where the are beaches on the south and east shores, they are mind-blowing.

260 (appears twice)

FIG. 2

PREVIEWS PROVIDING VIEWABLE REGIONS FOR PROTECTED ELECTRONIC DOCUMENTS

BACKGROUND

Conventionally, search systems receive a query having query words associated with electronic content from a user. The conventional search system processes the query to provide results that match the query words. The results include a listing of the electronic content that matches the query. In the conventional search system, the results provide the user with a view of the electronic content that is not under copyright protection. Because the electronic content is not under copyright protection, the conventional search system allows the user to interact with the electronic content without restrictions that limit the user's ability to access or view the electronic content.

The conventional search systems are not configured to adequately address restrictions associated with copyright protected electronic content that matches the query. When the electronic content is under copyright protection, the conventional search system does not generate results that provide the copyright protected electronic content to the user. Instead, the conventional search system may provide a thumbnail of the copyright protected electronic content and a summary that provides an overview of the substance included in the copyright protected electronic content. For instance, when the copyright protected electronic content is a book, the conventional search system may provide the user with a thumbnail of a cover slip for the book and a summary that describes the book's content. A user is unable to use the conventional search system to view or access portions of the copyright protected electronic content of books that match the query. To view the portions of the copyright protected electronic content that match the query, the user must purchase the copyright protected electronic content in its entirety without viewing or accessing the portions that match the query. Accordingly, the user is unable to determine how relevant the copyright protected electronic content is to the query without purchasing the copyright protected electronic content.

SUMMARY

A computer system includes a server that generates previews for protected electronic documents. The server receives a query having query terms from a client device. Additionally, the server receives and stores rules that control interactions with the protected electronic documents. The rules are provided by owners of the protected electronic documents. The server searches a database storing electronic documents and protected electronic documents. In turn, the server generates and transmits a viewable version of the electronic documents or protected electronic documents that match the query terms. When generating a viewable version for the protected electronic content, the server generates previews that present viewable regions of the protected electronic document. The viewable regions contain the query terms. The viewable versions of the protected electronic content are transmitted to the client device based on the rules stored by the server. Additionally, the server may generate obfuscated views of the remainder of the protected electronic content that does not contain the query terms.

The server may track a number for previews of different regions of the protected electronic content transmitted to the client device. The server limits the number of previews provided to the client device based on the rules stored by the server. The rules may forbid access to, or previews for, the protected electronic document, when the number of previews transmitted to the client surpasses a specified number. The server may inform the client device that the protected electronic content must be purchased to continue viewing or accessing the protected electronic content, when the specified number is surpassed.

This Summary is provided to introduce a selection of concepts in a simplified form. The selection of concepts are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a screen shot that illustrates a web page that provides previews for protected electronic documents;

DETAILED DESCRIPTION

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

As utilized herein the term "component" refers to any combination of software, firmware, and hardware. Additionally, as utilized throughout this description, the term "protected electronic document" refers to books, images, video, documents, or textual content in an electronic format that is under copyright protection. The term "viewable," as utilized herein, refers to both audible and visual consumption of an electronic document.

A computer system configured to deliver web pages, which include protected electronic content, to client devices is provided. In response to a query, a server may generate the web page that presents electronic documents and protected electronic documents having the query terms included in the query. The web pages may provide previews that enable the client devices to view a subset of the protected electronic content. The previews are generated by the server based on rules specified by owners of the protected electronic content. The previews may include viewable regions of the protected electronic content that include the query terms. Additionally, the web page may include an obfuscated view of regions that do not contain the query terms.

Accordingly, a client device is configured to receive previews that provide contextual information for protected electronic documents that contain query terms sent to the computer system. A user may utilize the previews to decide whether the protected electronic document is worth purchasing. Thus, the computer system provides a process that controls access to protected electronic documents based on the rules provided by the owners of the protected electronic documents.

In one embodiment, a computer system provides previews for protected electronic documents. The computer system includes a database that stores electronic documents, protected electronic documents, and rules that control interaction with the protected electronic documents. The computer system generates the previews based on the rules provided by the owners of the protected electronic documents.

Figure 1:
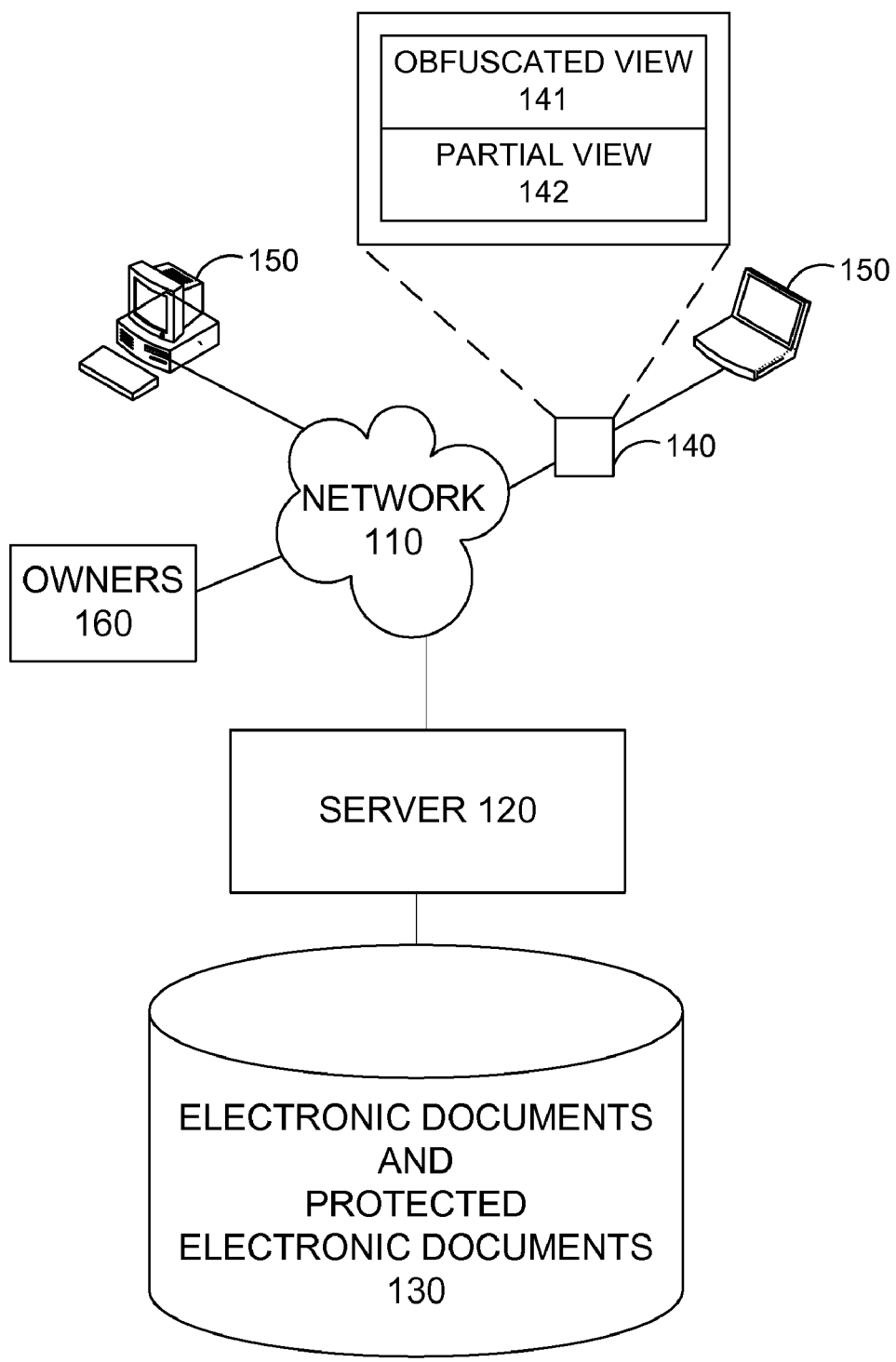
FIG. 1 is a network diagram that illustrates an exemplary operating environment.

FIG. 1 is a network diagram that illustrates an exemplary operating environment 100. The operating environment 100 includes a network 110, a server 120, electronic documents and protected electronic documents database 130, a web page 140, client devices 150, and owners 160.

The network 110 is configured to facilitate communication between the client devices 150 and the server 120. The network 110 may be a communication network, such as a wireless network, local area network, wired network, or the Internet. In an embodiment, the client devices 150 communicate queries to the server 120 utilizing the network 110. In response, the server 120 may communicate results that include viewable regions of electronic documents or protected electronic documents that match the queries.

The server 120 is a computing device. The server 120 receives queries having query terms from the client devices 150. The queries are utilized to search the electronic documents and protected electronic documents 130 to locate electronic content that matches the query terms included in the queries. Additionally, the server 120 may receive rules for the protected electronic documents from owners 160 of the protected electronic documents. The rules are utilized to control how the server 120 and client devices 150 interact with the protected electronic document. The server 120 generates a web page 140 that includes a listing of the electronic documents and protected electronic documents containing electronic content that matches the query terms. In certain embodiments, the web page 140 may include a partial view 142 of the protected electronic document for regions of the protected electronic documents that contain the query terms and an obfuscated view 141 for regions of the protected electronic document that do not contain the query terms.

The electronic documents and protected electronic documents database 130 is a database that stores electronic documents and protected electronic documents. The electronic documents contain electronic content that is not under copyright protection. The protected electronic documents contain electronic content that is under copyright protection. In some embodiments, the electronic documents and protected electronic documents database 130 may store rules received by the server 120. The rules may specify authorized actions that the server 120 and client device 150 may perform when accessing or viewing the protected electronic documents. The rules may specify the number of previews that a client device 150 is allowed for each protected electronic document stored in the electronic documents and protected electronic documents database 130. Additionally, the electronic documents and protected electronic documents database 130 may store cookies that are associated with each client device 150 that transmits a query to the server 120 and receives previews of protected electronic documents from the server 120. The cookies are utilized to track the access patterns of each client device 150. The cookies ensure that the number of different previews of a particular protected electronic document received by the client device 150 does not exceed a limit set by the rules associated with the particular protected electronic document. In some embodiments, the cookies stored by the electronic documents and protected electronic documents database 130 may enable the server 120 to track each client device's 150 interaction with the protected electronic document. The cookies may store an identifier for each protected electronic document accessed by the client and a count that represents the number of requests for additional previews associated with the protected electronic document. The cookies may be utilized to determine whether access to additional regions of a page of the protected electronic document contained in the web page 140 should be granted to the client device 150. After the client device 150 is denied further access to previews to the protected electronic document, the client device 150 may purchase the protected electronic document to obtain full access to the electronic content included in the protected electronic document. In certain embodiments, the electronic documents and protected electronic documents database 130 contain electronic content that includes technical information or recipes that may be very valuable to owners 160 as well as a user of the client device 150.

The web page 140 is generated by the server 120 in response to a query received from the client device 150. The web page 140 may present electronic content that matches the query. The electronic content may correspond to electronic documents or protected electronic documents. When the electronic content is associated with protected electronic documents, the web page 140 includes an obfuscated view 141 and a partial view 142. The obfuscated view 141 of the web page 140 provides blurred regions of the protected electronic document. The blurred regions of the protected electronic document does not contain the query terms. The partial view 142 of the web page 140 provides viewable regions of the protected electronic document. The viewable regions contain the query terms. The obfuscated view 141 and partial view 142 of the protected electronic document are generated based on the rules provided by the owner 160 of the protected electronic document. When the electronic content is associated with electronic documents, the web page 140 provides a view that allows the client device 150 to view the entire electronic document without restriction. In an embodiment, the server 120 transmits the web page 140 as a single page that includes an in-focus region that provides the partial view 142 and an out-of-focus region that provides the obfuscated view 141. The server 120 transmits the page to the client device 150, and the client device 150 displays the page to the user. In an alternate embodiment, the server 120 may transmit the web page 140 as two separate sections: an in-focus region that provides the partial view 142 and an out-of-focus region that provides the obfuscated view 141. The server 120 transmits the in-focus regions of the protected electronic document that contain the query terms. Also, the server 120 separately transmits the out-of-focus regions of the protected electronic document. The out-of-focus regions may represent an entire page or section of the protected electronic document. The server 120 may transmit location information along with the in-focus regions and out-of-focus regions to enable the client device 150 to position the in-focus regions and out-of-focus regions. The client device 150 uses the position information to position the in-focus regions on top of the out-of-focus regions.

The client devices 150 may be utilized by a user to provide queries to the server 120 via the network 110. In some embodiments, the results of the queries may identify electronic documents and protected electronic documents that are of interest to a user of the client device 150. Each client device 150 may include, without limitation, personal digital assistants, smart phones, laptops, personal computers, or any other suitable client computing device. The client devices 150 are configured to receive results that include, among other things, web pages that are generated based on the rules provided by owners 160 of protected electronic documents. In one embodiment, the client device 150 may request additional previews for the protected electronic document. When requesting additional previews, the client device 150 may specify that the partial view 142 should include a number of lines above or below the query terms included in the regions of the protected electronic document. The server 120 responds to the request for additional previews by transmitting only the requested additional regions of the protected electronic document to the client device 150.

The owners 160 may provide rules that control interaction with protected electronic documents. The rules provided by the owners are stored by the electronic documents and protected electronic documents database 130. The rules specify, among other things, a number of previews allowed for each protected electronic document and a size of the previews. The size of the preview may be dynamically altered based on the quality associated with words that surround the query terms in the protected electronic document. Additionally, in certain embodiments, the rules may specify whether the client device is allowed to move a preview associated with the protected electronic document to other regions of the protected electronic document that do not contain the query terms. Accordingly, the rules may provide limits on how the client device 150 may interact with each page of each protected electronic document owned by the owner 160.

One of ordinary skill in the art understands and appreciates that operating environment 100 has been simplified for description purposes and that alternate operating environments are within the scope and spirit of the above description.

The server provides a web page to a client device in response to the query received from the client device. In some embodiments, the web page includes an obfuscated view and a partial view. The obfuscated view and partial view are generated when the server is providing access to protected electronic documents. Moreover, the web page may include indicators that represent a number of additional previews available, used, or remaining for the client device, when viewing or accessing a particular protected electronic document.

FIG. 2 is a screen shot that illustrates a web page 200 that provides previews for protected electronic documents. The web page 200 further describes the web page 140 of FIG. 1. The web page 200 includes a search field 210, a listing of results 220, a select additional preview button 230, a remaining previews indicator 240, a buy button 250, an obfuscated view 260, and a partial view 270.

The search field 210 enables the client device to generate a query for electronic documents or protected electronic documents. The search field 210 receives query terms from the client device. In turn, the query terms are transmitted to the server for processing, and the server provides the listing of results 220 that match the query entered in the search field 210. For instance, the client device may generate a query for "mind-blowing."

The listing of results 220 provide a list of documents that include words that match the query terms. The list of documents may include electronic documents and protected electronic documents. The listing of results 220 may include a snippet for each electronic document or protected electronic document included in the listing of results 220. For instance, the listing of results 220 may include a snippet corresponding to each electronic document and protected electronic document that contains the query term "mind blowing." A user may select a document from the listing of results 220. When the document selected by the user is an electronic document, the web page 200 presents a view that allows the user to view the entire electronic document without restrictions. When the document selected by the user is a protected electronic document, the web page 200 presents a view that includes an obfuscated view 260 and a partial view 270. The partial view 270 provides the user with a viewable region of the protected electronic document, where the viewable region contains the query terms provided in the search field 210 and text that surrounds the query terms. For instance, the partial view 270 provides a clear view of a region that includes text that surrounds the query term "mind-blowing."

The select additional preview button 230 allows the user to obtain additional previews associated with the protected electronic document. The select additional preview button 230 may be a magnifier icon or visual icon that allows the user to access additional regions of the protected electronic document. In certain embodiments, the additional previews are limited, based on the rules provided by the owner of the protected electronic document, to regions of the protected electronic document that contain the query terms. In an alternate embodiment, the additional previews may be located anywhere in the protected electronic document that the user specifies. The user may utilize the additional preview button 230 to specify that a portion of the protected electronic document that is currently obfuscated should be revealed as a partial view 270. After the server receives the request that identifies the selected portion of the protected electronic document, the server updates the web page by sending an additional partial view 270 that corresponds to the selected potion. The user may select additional previews only when a count of additional previews used by the client device does not exceed a maximum number of additional previews allowed for the protected electronic document. In certain embodiments, the maximum number of additional previews may be specified in a rule provided by the owner of the protected electronic document.

The remaining previews indicator 240 is a count of the remaining previews allowed for a particular protected electronic document currently displayed by the web page 200. The count is calculated by tracking a number of partial views 270 of the protected electronic document accessed by the client device. The maximum number of additional previews specified in the rule for the particular protected electronic document is subtracted from the number of partial views 270 accessed by the user of the client device. This difference yields the count of the remaining previews allowed for the particular protected electronic document. In certain embodiments, the maximum number of previews allowed varies depending on a particular page of the particular protected electronic document that is rendered by the web page 200. In other words, each page of the particular protected electronic document may be associated with a different maximum number of previews allowed. Accordingly, the remaining previews indicator 240 may vary based on the page of the particular protected electronic document rendered by the web page 200.

The buy button 250 provides the user with the ability to purchase the protected electronic document that is rendered by the web page 200. The buy button 250 triggers a purchase dialog that provides a price for full access to the protected electronic document and terms for using the protected electronic document. When the user purchases the protected electronic document, the user is allowed to view the protected electronic document in its entirety within a time period included in the terms.

The obfuscated view 260 provides a blurred view of regions of the protected electronic document. The regions of the obfuscated view 260 do not contain the query terms included in the search field 210. In some embodiments, the obfuscated view 260 may be a high resolution image having a blur effect. The high resolution image represents a region of the protected electronic document that does not contain the query terms. Alternatively, when the client device is connected on a low bandwidth connection, the obfuscated view 260 may be a low resolution image having a mosaic effect that reduces visual clarity. The low resolution image represents a region of the protected electronic document that does not contain the query terms. In certain embodiments, the reduction in visual clarity corresponding to a specified region in the obfuscated view 260 may be removed by utilizing the select additional preview button 230 in the specified region.

The partial view 270 provides a clear viewable region of the protected electronic document. The regions of the partial view 270 contain the query terms included in the search field. In some embodiments, the size of the partial view 270 is based on the quality of the words that surround the query terms. For instance, the partial view 270 may be sized to reveal two lines above and below each query term included in a region of the protected electronic content. The size of the partial view 270 may be limited by a rule defined by the owner of the protected electronic document. In other embodiments, the size of the partial view 270 is based on a maximum number of words specified by the user, where the maximum number of words does not generate a partial view 270 that violates the rule defined by the owner. Accordingly, the size dynamically assigned to the partial view 270 is always constrained by the rules provided by the owner of the protected electronic document that limit the size of the partial view 270.

In certain embodiments, the sever executes a method to generate previews for protected electronic documents. The server determines whether a document is protected and generates an appropriate web page that enables the client device to view an electronic document or a protected electronic document based on the rules provided by the owner of the protected electronic document.

Figure 3:
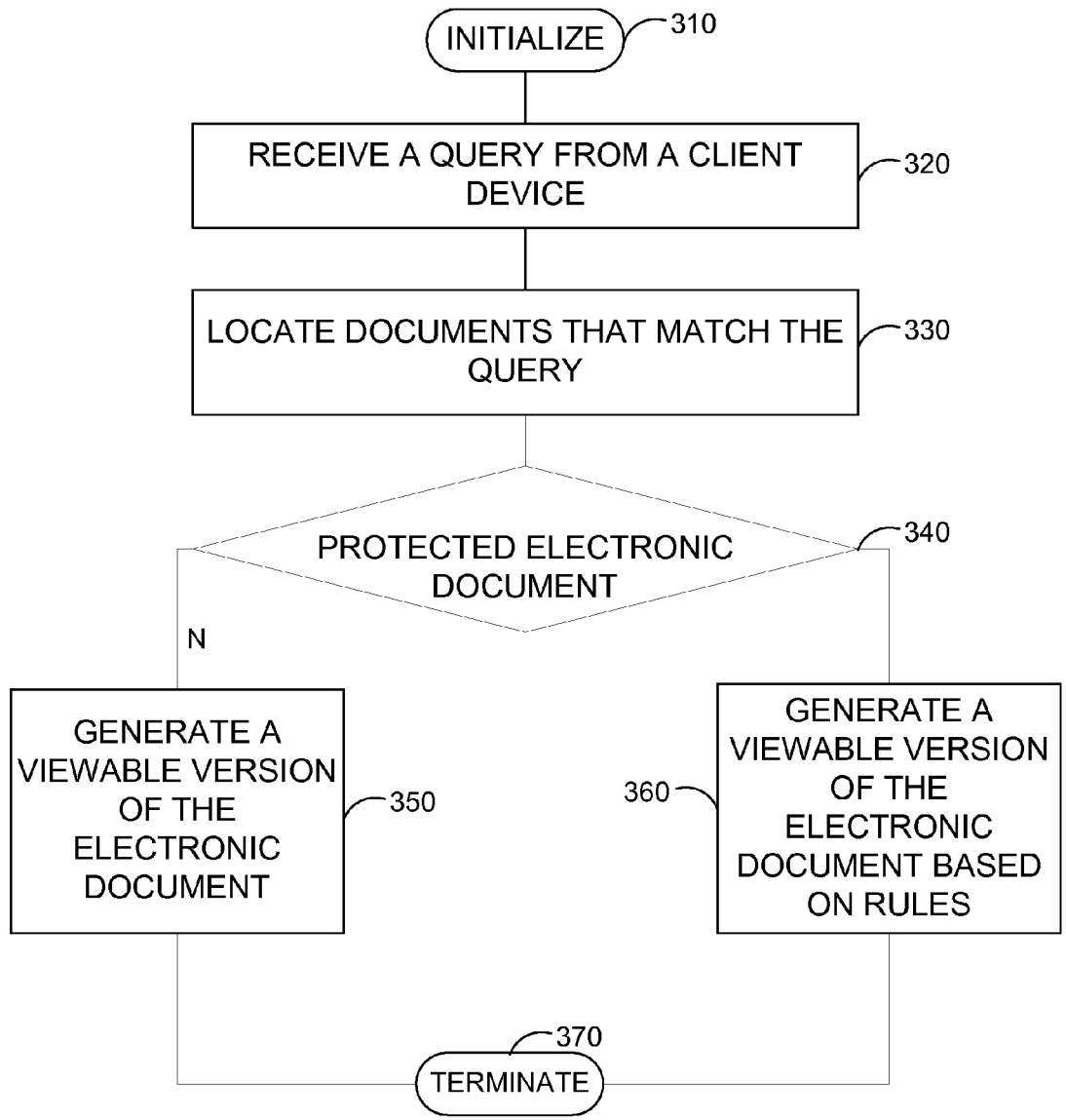
FIG. 3 is a flow diagram that illustrates an exemplary method to generate previews for the protected electronic documents.

FIG. 3 is a is a flow diagram that illustrates an exemplary method to generate previews for the protected electronic documents. The method is initialized in step 310 when the sever is online. In step 320, the server receives a query from a client device. In step 330, the server locates documents that match the query. The matching documents may include electronic documents and protected electronic documents. In step 340, the server determines whether the matching documents are protected or not. When the matching document is not a protected electronic document, the server generates a viewable version of a matching electronic document, in step 350. The client device is allowed to view the viewable version of the matching electronic document without restriction. The method terminates in step 370. When the matching document is a protected electronic document, the server generate a viewable version of the matching protected electronic document based on rules provided by an owner of the protected electronic document, where the viewable version includes a partial view of regions that match the query, in step 360. The client device may access the viewable version of the matching protected electronic document based on the rules associated with the protected electronic document. The method terminates in step 370.

In some embodiments, the sever executes a method to track previews selected for the protected electronic documents. The client device may request additional previews for the protected electronic document. The server may utilize a search session that is associated with the client device and a cookie to decide when to prevent the client device from receiving additional previews for other regions of the protected electronic document.

Figure 4:
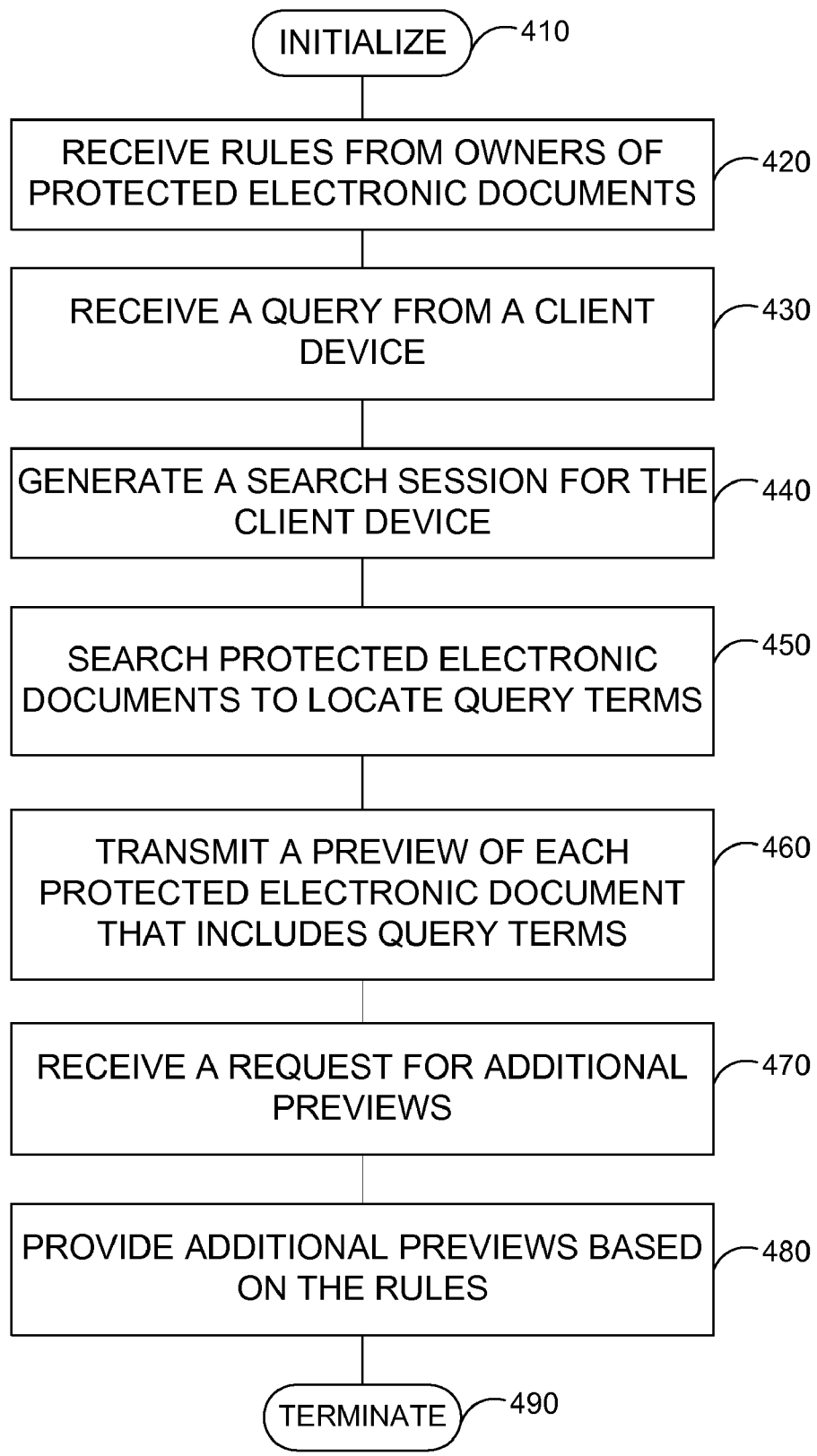
FIG. 4 is a flow diagram that illustrates an exemplary method to track previews selected for protected electronic documents.

FIG. 4 is a flow diagram that illustrates an exemplary method to track previews selected for protected electronic documents. The method is initialized in step 410 when the sever is online. In step 420, the server receives rules from owners of the protected electronic documents. In step 430, the server receives a query from the client device. In step 440, the sever generates a search session for the client device. In turn, the server searches for protected electronic documents that match the query, in step 450. In step 460, a preview for each protected electronic document that matches the query is generated and transmitted to the client device. In step 470, the server receives a request for additional previews of a protected electronic document. In step 480, the server provides an additional preview, to the client device, for the protected electronic document based on the rules associated with the protected electronic document. In step 490 the method terminates.

In summary, a server provides a web page that includes obfuscated views and partial views for protected electronic documents that match the query terms. The client devices may interact with the protected electronic documents to view regions of the protected electronic documents that contain the query terms. In some embodiments, rules provided by an owner limit a user's ability to access additional views for other regions of the protected electronic document.

The foregoing descriptions are illustrative, and modifications in configuration and implementation will occur to persons skilled in the art. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

The invention claimed is:

1. One or more computer-readable media having computer-executable instructions embodied thereon that perform a method to generate previews for protected electronic documents, the method comprising:
    receiving a query having query terms from a client device;
    locating, in a database, stored electronic documents and protected electronic documents that match the query terms;
    determining whether the located documents are protected;
    generating a viewable version of electronic documents that is unrestricted, when the documents are not protected; and
    generating a viewable version of protected electronic documents based on rules provided by owners of the protected electronic documents, wherein the viewable version includes previews that provide a partial view of regions of the protected electronic documents that include the query terms and obfuscated views of regions of the protected electronic documents that do not include the query terms, when the documents are protected.

2. The media of claim 1, wherein the protected electronic documents contain content that is under copyright protection.

3. The media of claim 1, further comprising transmitting the viewable version of the electronic documents or the protected electronic documents to the client device.

4. The media of claim 1, wherein the previews include text, image, or sound that provide context within the protected electronic documents, for the query terms.

5. The media of claim 1, wherein a size of the preview is based on at least two of the following: a quality assigned to query terms, a quality assigned to the text that surrounds the query terms, and the rules provided by the owner.

6. The media of claim 1, wherein the rules provided by the owner control interaction with the protected electronic documents.

7. The media of claim 6, wherein the rules specify a maximum number of previews allowed for each page of each protected electronic document.

8. The media of claim 6, wherein the rules allow the preview within each page of each protected electronic document to move.

9. The media of claim 7, wherein the rules prevent the previews within each page of each protected electronic document from moving.

10. One or more computer-readable media having computer-executable instructions embodied thereon that perform a method to track previews selected for protected electronic documents, the method comprising:
   receiving rules from owners of protected electronic documents;
   receiving a query having query terms from a client device;
   generating a search session for the client device;
   searching the protected electronic documents to locate the query terms;
   transmitting a preview of each protected electronic document, wherein the preview is a viewable portion of a region of the protected electronic document that includes the query terms;
   receiving a request to preview additional portions of the protected electronic document; and
   providing the additional portions of the protected electronic document based on the rules.

11. The media of claim 10, wherein the rules reduce a total number of previews that a client device can request during a search session that corresponds to the protected electronic document.

12. The media of claim 11, wherein the rules specify a maximum number of additional previews that can be requested for the protected electronic document.

13. The media of claim 10, wherein generating the search session for the client device further comprises creating a cookie to identify the client device during subsequent search sessions.

14. The media of claim 13, wherein a count that represents a number of requests, received from the client device, for previews of additional portions of the protected electronic document is generated during the search session.

15. The media of claim 14, wherein the cookie stores an identifier for the protected electronic document and the count that represents the number of requests for additional previews associated with the protected electronic document.

16. The media of claim 10, providing the additional portions of the protected electronic document based on the rules further comprises transmitting a preview that includes the additional portion of the protected electronic document without transmitting the entire protected electronic document.

17. A computer system to present previews for protected electronic documents, the computer system comprising:
   client devices configured to generate queries having query terms;
   databases configured to store protected electronic documents and rules associated with the protected electronic documents; and
   servers configured to provide the protected electronic documents that match the query terms, wherein the servers generate web pages that comprise previews that provide viewable portions of regions of the electronic document that contain the query terms and obfuscated views that provide blurred regions of the remainder of the protected electronic document that do not contain the query terms.

18. The computer system of claim 17, wherein the webpage includes an indicator that provides the client devices with a total number of previews allowed for each protected electronic document.

19. The computer system of claim 17, wherein the webpage includes an indicator that provides the client with a total number of previews remaining for each protected electronic document.

20. The computer system of claim 17, wherein the webpage includes an indicator that provides the client with a number of previews used by the client for each protected electronic document.

* * * * *